June 2, 1936.  F. JEREMIASSEN  2,042,661
CRYSTALLIZATION APPARATUS
Filed Nov. 4, 1932
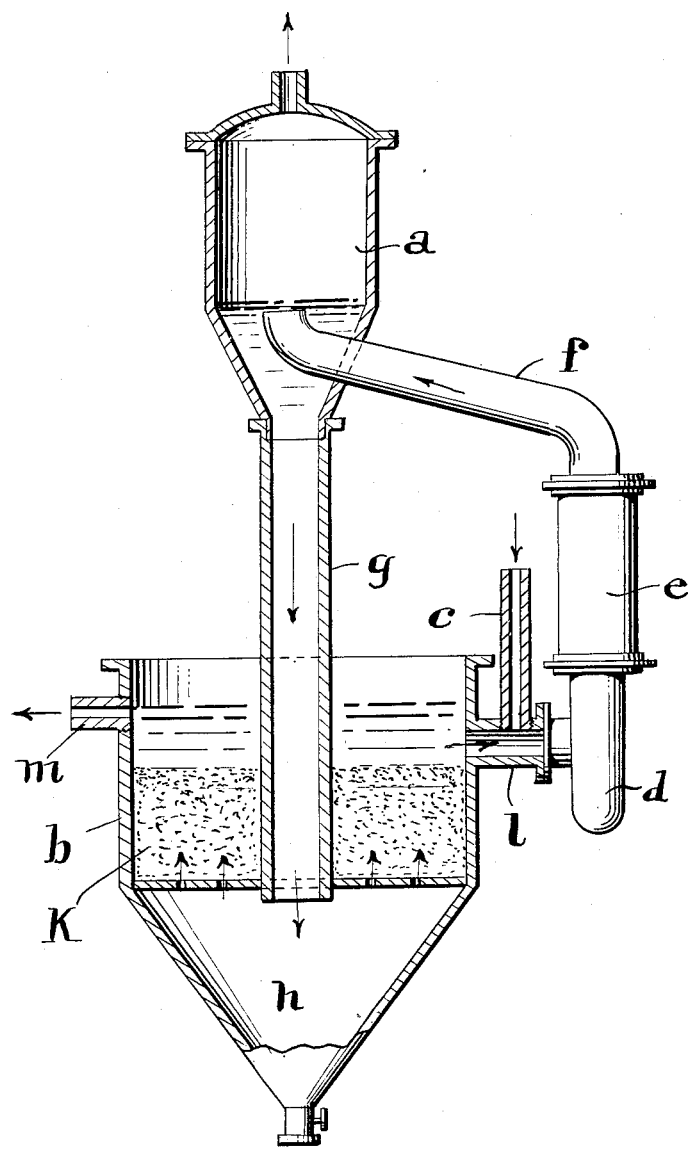
INVENTOR:
F. Jeremiassen
BY: Marks & Clerk
ATTORNEYS.

Patented June 2, 1936

2,042,661

UNITED STATES PATENT OFFICE 2,042,661

CRYSTALLIZATION APPARATUS

Finn Jeremiassen, Oslo, Norway, assignor to Aktieselskapet Krystal, Oslo, Norway Application November 4, 1932, Serial No. 641,315
In Norway November 6, 1931

2 Claims. (Cl. 23—273)

It is known, in connection with evaporating devices and so-called vacuum cooling apparatus, to cause substances to precipitate from their solutions at a place in the apparatus where vacuum exists above the liquid level, and thereupon to cause the liquid and the precipitated matter to pass into another space with atmospheric pressure prevailing above a free liquid level, in order to permit the precipitate to settle in said space and carrying on the crystallization process partly through cooling. The advantage obtained by this procedure consists therein that the interior parts of the vessel of sedimentation become easily accessible during operations and that the precipitate is readily removable.

The present invention has for its object to employ a similar arrangement for a different crystallization process which, it is true, was already known, but in connection with which the use of said arrangement had not hitherto been considered practicable.

The invention is suitably described by reference to the accompanying drawing, in which an apparatus embodying the invention is diagrammatically illustrated.

Reference character $a$ represents an evaporator under vacuum and $b$ a suspension container. A pump $d$ causes the solution contained in the apparatus to circulate in known manner through the heater $e$ up through the pipe $f$, the evaporator $a$ down the pipe $g$, the cone $h$ through the perforated bottom plate $i$, then up through the suspension of crystals $k$ in the container $b$ and the pipe $l$, fresh solution being continuously added through the pipe $c$.

The illustrated apparatus is operated with a free liquid level under atmospheric pressure in the suspension container $b$.

No one had previously ventured carrying this arrangement into effect in spite of its affording very substantial advantages, inter alia, the easy accessibility of the suspension $k$, which is the most delicate part of the process, requiring to be kept at a proper height, in a suitably "loose" condition, permitting the proper relative movement between the constituent parts, furnishing a proper temperature and size of granule which makes it sometimes necessary to add new seed crystals from without.

The reason why no one had hitherto dared, nor been able to employ the arrangement just described, is the great difficulties involved in connection therewith and which are not present at the apparently closely cognate, known arrangements referred to above.

In the case of the latter no difficulties were experienced in passing a solution through a fall pipe from the vacuum space down to a sedimentation vessel operating under atmospheric pressure; because large amounts of precipitated crystals were present in the solution, with the result that no supersaturation of any appreciable degree could possibly exist for any length of time. And even if local supersaturations at the tube wall should lead to the formation of new crystals this would be entirely harmless, as the object of the whole process is just to have crystals precipitate.

In the case of the present invention, however, the solution contained in the evaporator $a$ and the pipe $g$ has to be kept strongly supersaturated and as free from crystals as possible. At such a heavy degree of supersaturation the danger of forming salt deposits is extremely great owing to the unavoidable cooling taking place at the tube wall. And, while in the apparatus mentioned above, the comparatively heavy cooling of the liquid level in the sedimentation vessel caused by vaporization and radiation as well as conduction of heat, was entirely harmless, it is, in the suspension vessel of the present invention, most destructive in its effect. If a vast number of new crystals is formed at the liquid level, the principle on which the present process of crystallization is based, becomes entirely infeasible. For it is only the granules in the suspension $k$ which are intended to grow. The granules must not increase in numbers but only in size of each individual granule. If, therefore, a multitude of new seed crystals is formed, the precipitate will accordingly have to be divided on a considerably greater number of granules. Obviously it will then be impossible to produce large crystals, such as is the object of the present process of crystallization.

These difficulties were so considerable and apparently proved so insuperable that all previous experimenters had given up the problem as insoluble.

Any data or experience on this subject could also not be derived from the apparatus illustrated in Fig. 2 of applicant's previous Patent No. 1,860,741. At the low temperature existing in such a cooling apparatus, in which no boiling is taking place, no dangerous local cooling will occur at the tube walls, nor will any dangerous vaporization or conduction of heat take place from the liquid level. And, as mentioned above, no one had hitherto contemplated or succeeded in keeping an open, easily accessible liquid level under atmospheric pressure in the suspension vessel of an evaporation apparatus according to Fig. 1 in applicant's Patent 1,860,741.

It was only after expensive experiments over a number of years and practical experience from working on a large scale combined with stringent reviewing of all salient points, that the applicant of the present invention came to the conclusion that the process of crystallization described herein was actually feasible also in the case of a vacuum cooling apparatus having the easy accessibility and controlability of the suspension so long aimed at, and that the destructive effects of undesirable new small crystals met with by all other experimenters, arose solely owing to a number of minor faults in design and operation, whereof no one had previously been aware and which had led to the conviction that a process of the present invention was impossible.

I claim:

1. A crystal growth apparatus comprising a super-saturating chamber, a crystal growth chamber open to the atmosphere, a perforated bottom for carrying a suspension of crystals, a pump for circulating a solution of the substance to be crystallized, a conduit for the solution to pass from the pump to the super-saturating chamber, the super-saturating chamber being closed, and a conduit for the solution to pass from the super-saturating chamber to the crystal growth chamber terminating at a point below the perforated bottom, the super-saturating chamber being arranged at a considerable height above the crystal growth chamber.

2. A crystal growth apparatus comprising a crystal growth chamber open to the atmosphere, a super-saturating chamber arranged at a considerable height above the crystal growth chamber, a support for carrying a suspension of crystals, a pump for circulating a solution of the substance to be crystallized, a conduit for the solution to pass from the pump to the super-saturating chamber, the super-saturating chamber being closed, and a conduit for the solution to pass from the super-saturating chamber to the crystal growth chamber terminating at a point adjacent to said support so as to pass the solution through the crystal suspension.

FINN JEREMIASSEN.